US012087159B2

(12) United States Patent
Moncomble et al.

(10) Patent No.: US 12,087,159 B2
(45) Date of Patent: Sep. 10, 2024

(54) METHOD FOR MANAGING A STATE OF URGENCY OF A FIRST VEHICLE AND ASSOCIATED MANAGEMENT DEVICE

(71) Applicant: ORANGE, Issy les Moulineaux (FR)

(72) Inventors: Ghislain Moncomble, Chatillon (FR); Mathieu Lefebvre, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 288 days.

(21) Appl. No.: 17/786,212

(22) PCT Filed: Dec. 17, 2020

(86) PCT No.: PCT/FR2020/052509
§ 371 (c)(1),
(2) Date: Jun. 16, 2022

(87) PCT Pub. No.: WO2021/123647
PCT Pub. Date: Jun. 24, 2021

(65) Prior Publication Data
US 2023/0020201 A1  Jan. 19, 2023

(30) Foreign Application Priority Data
Dec. 20, 2019 (FR) ...................................... 1915171

(51) Int. Cl.
*G08G 1/0965* (2006.01)
*G01C 21/34* (2006.01)
*G08G 1/0967* (2006.01)

(52) U.S. Cl.
CPC ....... *G08G 1/0965* (2013.01); *G01C 21/3407* (2013.01); *G08G 1/096758* (2013.01); *G08G 1/096775* (2013.01)

(58) Field of Classification Search
CPC .......... G08G 1/0965; G08G 1/096758; G08G 1/096775; G08G 1/096816;
(Continued)

(56) References Cited

U.S. PATENT DOCUMENTS

2017/0116849 A1   4/2017   Foreman et al.
2017/0364069 A1   12/2017  Colella et al.
(Continued)

FOREIGN PATENT DOCUMENTS

| FR | 3076046 A1 | 6/2019 |
| WO | 2017151937 A1 | 9/2017 |
| WO | 2019181844 A1 | 9/2019 |

OTHER PUBLICATIONS

English translation of the Written Opinion of the International Searching Authority dated May 19, 2021 for corresponding International Application No. PCT/FR2020/052509, filed Dec. 17, 2020.
(Continued)

*Primary Examiner* — Behrang Badii
(74) *Attorney, Agent, or Firm* — David D. Brush; Westman, Champlin & Koehler, P.A.

(57) ABSTRACT

A method for managing an urgency state of a first vehicle, implemented by a managing system. The method includes: receiving a first indication of the urgency state of the first vehicle; determining a list of potential itineraries including at least one potential itinerary of the first vehicle; and sending an alert message to at least one detecting element, located at a traffic lane, the at least one detecting element being determined as a function of the at least one potential itinerary of the first vehicle.

12 Claims, 3 Drawing Sheets

(58) Field of Classification Search
CPC ......... G08G 1/09685; G08G 1/096716; G01C 21/3407; G01C 21/3492
See application file for complete search history.

(56) References Cited

U.S. PATENT DOCUMENTS

| | | | |
|---|---|---|---|
| 2019/0088115 A1* | 3/2019 | Tanabe | G08G 1/164 |
| 2020/0242922 A1* | 7/2020 | Dulberg | G01S 5/06 |
| 2020/0312133 A1* | 10/2020 | Wang | H04W 4/024 |
| 2020/0342759 A1 | 10/2020 | Moncomble | |
| 2021/0179141 A1* | 6/2021 | Sadek | B60W 50/14 |
| 2021/0370983 A1* | 12/2021 | Oba | G08G 1/166 |

OTHER PUBLICATIONS

European Standard, "Intelligent Transport Systems (ITS); Vehicular Communications; Basic Set of Applications; Part 2: Specification of Cooperative Awareness Basic Service", Final draft ETSI EN 302 637-2 V1.3.1 (Sep. 2014).
International Search Report dated May 7, 2021 for corresponding International Application No. PCT/FR2020/052509, Dec. 17, 2020.
Written Opinion of the International Searching Authority dated May 7, 2021 for corresponding International Application No. PCT/FR2020/052509, filed Dec. 17, 2020.
French Search Report and Written Opinion dated Sep. 10, 2020 for corresponding French Application No. 1915171, filed Dec. 20, 2019.

* cited by examiner

[Fig. 1]
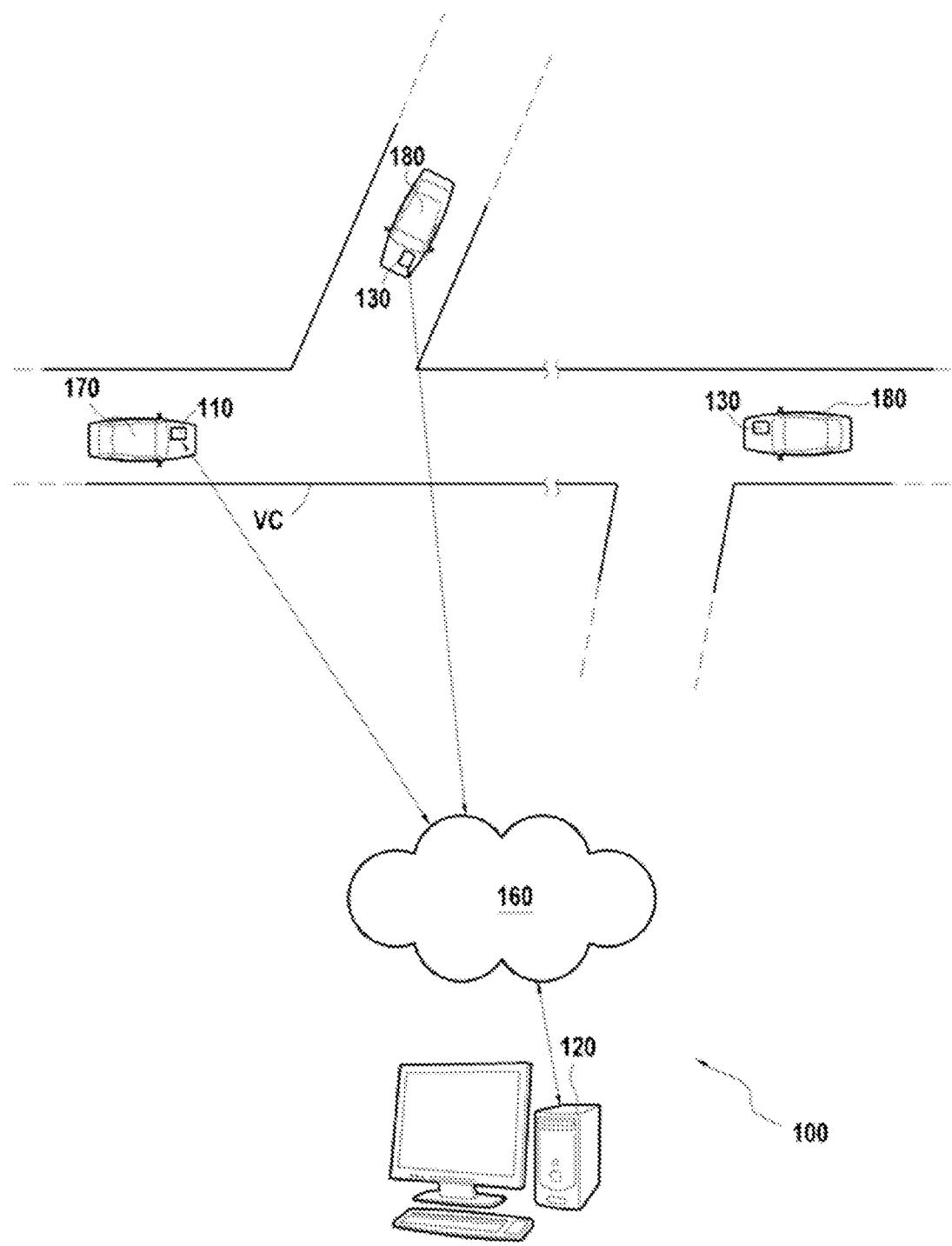

[Fig. 2]
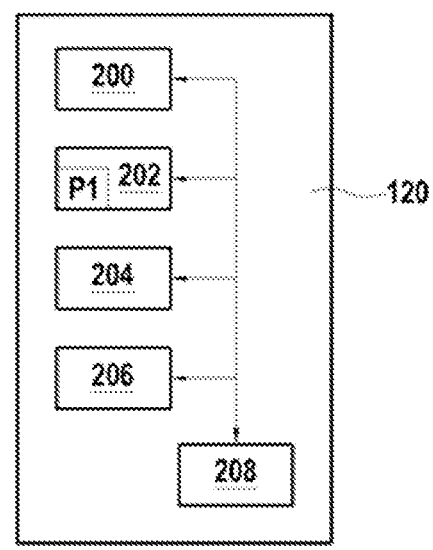

[Fig. 3]
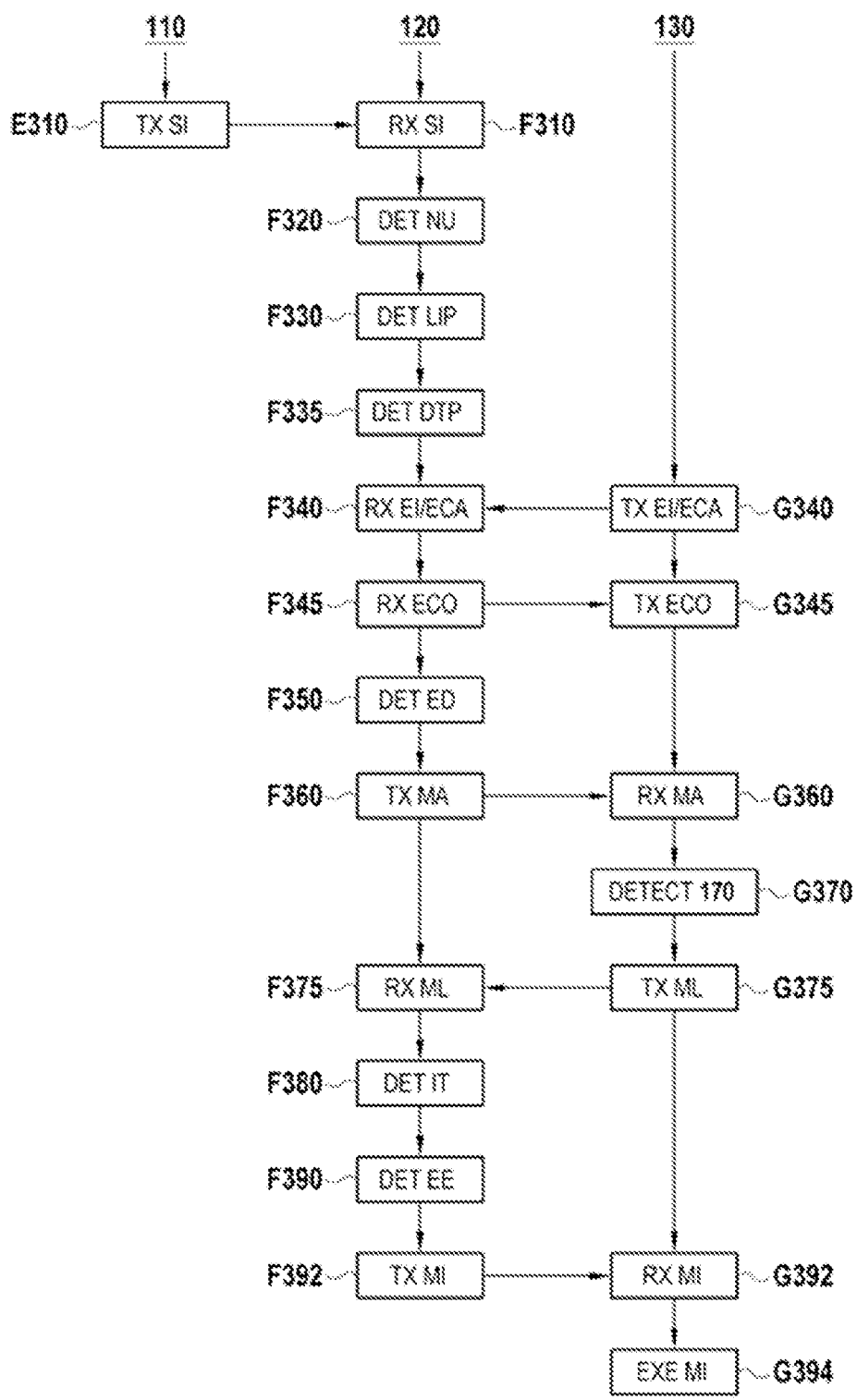

METHOD FOR MANAGING A STATE OF URGENCY OF A FIRST VEHICLE AND ASSOCIATED MANAGEMENT DEVICE

CROSS-REFERENCE TO RELATED APPLICATIONS

This Application is a Section 371 National Stage Application of International Application No. PCT/FR2020/052509, filed Dec. 17, 2020, which is incorporated by reference in its entirety and published as WO 2021/123647 A1 on Jun. 24, 2021, not in English.

TECHNICAL FIELD

This invention relates to the field of vehicles and assisted driving of vehicles, and more specifically relates to a technique for managing an urgency state of a vehicle.

PRIOR ART

In a known manner, when a priority emergency services vehicle in operation (such as an ambulance, a fire truck or a police car) is circulating on a traffic lane, it indicates its presence to the vehicles on its path via an alerting means such as a siren or a flashing light.

By custom and/or to respect the highway code, the alerted vehicles then let the priority emergency services vehicle pass in order to facilitate its travel, for example by pulling over on the side of the road or yielding priority at an intersection.

However, the drivers of the vehicles present on the journey of the priority emergency services vehicle sometimes struggle to locate the priority emergency services vehicle, and thus can have trouble determining whether or not they must perform a maneuver in order to allow the priority emergency services vehicle to pass. For example, a driver hearing a siren may fail to determine whether the priority emergency services vehicle is approaching head-on or from behind. Similarly, a driver seeing the light signal of a flashing light can struggle to determine what lane the priority emergency services vehicle is circulating on.

Furthermore, there is currently no solution making it possible to adapt the road traffic in order to let through a vehicle which is not a priority emergency services vehicle (for example a private vehicle), but which is exceptionally in an urgency state (for example a vehicle transporting a woman in labor or an injured person, or else a vehicle transporting repair mechanics following the detection of a gas leak etc.) This is because such vehicles do not have any alerting means at their disposal.

SUMMARY OF THE INVENTION

This invention relates to a method for managing an urgency state of a first vehicle, implemented by a managing system, characterized in that it comprises the following steps:
  receiving a first indication of the urgency state of the first vehicle,
  sending an alert message to at least one so-called detecting element, located at a traffic lane, said at least one detecting element being determined as a function of at least one potential itinerary of the first vehicle, the alert message comprising an identifying element of the first vehicle allowing the detection of the first vehicle by the detecting element;
  receiving a message of location of the first vehicle coming from said at least one first detecting element,
  confirming said at least one potential itinerary as a confirmed itinerary, as a function of the location message received.

Thus, owing to the invention, the vehicle in an urgency state can be accurately located. The alert condition sent to said at least one detecting element triggers the detection of the first vehicle by said at least one detecting element. Specifically, the alert message indicates to said at least one detecting element that the first vehicle is in an urgency state and is able to follow a portion of lane at which the detecting element is currently located. Furthermore, the alert message comprising an identifying element of the first vehicle allows the detection of the first vehicle by the detecting element.

The detecting element, having detected the first vehicle, addresses a message of location of the first vehicle, this location message being used to confirm said at least one potential itinerary of the first vehicle.

According to an embodiment, the method includes the following steps:
  receiving a first indication of the urgency state of the first vehicle,
  determining a list of potential itineraries comprising at least one potential itinerary of the first vehicle, and
  sending an alert message to at least one so-called detecting element, located at a traffic lane, said at least one detecting element being determined as a function of said at least one potential itinerary of the first vehicle.

Thus, the method according to the invention thus makes it possible to adapt the vehicle traffic in order to let any type of vehicle in an urgency state pass, and not only the priority emergency services vehicles. Furthermore, the method according to the invention makes it possible to accurately locate the vehicle in an urgency state.

In an embodiment, the first indication includes an element of information relating to the confirmed arrival point of the first vehicle, said at least one potential itinerary of the first vehicle being determined as a function of said confirmed arrival point.

In a particular embodiment, the managing system comprises only a managing device, the managing device being a remote server or a terminal associated with the first vehicle or with a traffic lane element.

In an embodiment, the method further comprises the sending of an instruction message to at least one so-called executing element, said at least one executing element being determined as a function of said confirmed itinerary.

In a particular embodiment, the method further comprises the following steps:
  receiving a first message of location of the first vehicle, comprising an element of location information of the first vehicle,
  determining a confirmed itinerary in the list of potential itineraries, as a function of the element of location information,
  sending instruction messages to at least one so-called executing element, said at least one executing element being determined as a function of said confirmed itinerary.

Thus, the method according to the invention makes it possible to accurately locate the vehicle in an urgency state. The circulation of the vehicle in the urgency state is also improved.

In a particular embodiment, the first indication comprises an element of information relating to the type of urgency of the first vehicle, the method further comprising a step of determining the level of urgency as a function of said element of information relating to the type of urgency, the alert message comprising an element of information relating to the level of urgency of the first vehicle, and/or the instruction message comprising the element of information relating to the level of urgency of the first vehicle.

In a particular embodiment, the step of determining a list of potential itineraries comprises the following sub-steps:
  determining a departure area of the first vehicle,
  determining at least one potential departure point in the departure area,
  for each potential departure point, determining at least one potential itinerary, on the basis of said potential departure point.

In a particular embodiment, the first indication comprises an element of information relating to a confirmed departure point, the step of determining a list of potential itineraries comprising the following sub-steps:
  determining at least one potential arrival point as a function of said element of information relating to the confirmed departure point and of the element of information relating to the type of urgency of the first vehicle,
  for each potential arrival point, determining at least one potential itinerary, on the basis of the confirmed departure point and of said potential arrival point.

In a particular embodiment, the method further comprises the following steps:
  for each potential itinerary of the list of potential itineraries, determining the potential journey time associated with said potential itinerary,
  determining a most likely arrival point as a function of each potential journey time and/or of an item of information relating to the ability to manage the urgency at the arrival point of each potential itinerary,
  transmitting to the first vehicle at least one potential itinerary associated with the most probable arrival point.

In a particular embodiment, the potential journey time is corrected by applying a correction ratio computed as a function of an element of real-time traffic information and/or as a function of an element of information relating to a level of vehicles able to act on an instruction of the instruction message.

In a particular embodiment, said at least one detecting element is determined as a function of at least one contextual element relating to said at least one detecting element, from among the following list of contextual elements:
  a geolocation position,
  a provisional itinerary,
  a speed,
  an item of information related to the traffic in the environs of the geolocation position of the detecting element, said detecting element being able to be situated on at least one itinerary portion of said at least one potential itinerary, said at least one itinerary portion being able to be followed by the first vehicle during a predetermined time period, said at least one detecting element being added to a list of detecting elements associated with said at least one itinerary portion of said at least one potential itinerary, said predetermined time period being less than five minutes.

In a particular embodiment, the method further comprises the following steps:
  detecting the implementation of at least one maneuver instruction of the instruction message by said at least one executing element,
  deducing a probability of presence of the first vehicle as a function of the detection of the implementation of said at least maneuver instruction of the instruction message,
  sending a second location message of the first vehicle.

In a particular embodiment, said at least one executing element is determined from among said at least one detecting element of said at least one list of detecting elements.

The invention also relates to a device for managing an urgency state of a first vehicle, characterized in that it comprises:
  a receiving module able to receive a first indication of the urgency state of the first vehicle,
  a determining module able to determine a list of potential itineraries comprising at least one potential itinerary of the first vehicle, and
  a sending module able to send an alert message to at least one so-called detecting element, situated at a traffic lane, said at least one detecting element being determined as a function of said at least one potential itinerary of the first vehicle.

In a particular embodiment, the managing device is a remote server or a terminal associated with the first vehicle or a traffic lane element.

In a particular embodiment, the different steps of the managing method according to the invention are determined by computer program instructions.

Consequently, the invention also relates to a computer program, on an information medium, this program including instructions suitable for implementing steps of a managing method according to the invention.

Each of these programs can use any programming language, and be in the form of source code, object code, or intermediate code between source code and object code, such as in a partially compiled form, or in any other desirable form.

The invention also relates to an information medium readable by a computer and including instructions of a computer program as mentioned above.

The information medium can be any entity or device capable of storing the program. For example the medium may include a storage means, such as a ROM, for example a CD-ROM or a microelectronic circuit ROM, or else a magnetic recording means, for example a hard disk.

Moreover, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit wherein a program is incorporated, the circuit being suitable for executing or for being used in the execution of the method in question.

BRIEF DESCRIPTION OF THE DRAWINGS

Other features and advantages of this invention will become apparent from the description given below, with reference to the appended drawings which illustrate an exemplary embodiment thereof devoid of any limitation. In the figures:

FIG. 1 schematically represents a managing system able to implement a managing method according to an exemplary embodiment of the invention;

FIG. 2 schematically represents a server remote from the managing system of FIG. 1;

FIG. 3 represents, in the form of a flow chart, the main steps of a managing method according to an exemplary embodiment of the invention.

DESCRIPTION OF THE EMBODIMENTS

FIG. 1 schematically represents a managing system 100 able to implement a method for managing an urgency state of a first vehicle, according to an exemplary embodiment of the invention.

The system comprises a plurality of modules, including a receiving module, a determining module and a sending module (not shown).

The system 100 comprises a first terminal 110, a remote server 120, and at least one other terminal, the so-called second terminal 130. The system 100 can further comprise an urgency management service (not shown).

In addition, the system 100 may comprise one or more other remote servers, for example dedicated to long-term storage (not shown).

The first terminal 110, the remote server 120, each second terminal 130 and/or the urgency management service server can be connected to a telecommunications network 160 in order to communicate with one another. No limitation is attached to the nature of the telecommunications network. It can for example by a WiFi network or a mobile telephony network (3G, 4G, 5G, etc. type).

In addition, the telecommunications protocols used can be varied. The protocols used are for example the protocols BTP/GeoNet/UDP/IP (for "Basic Transport Protocol/GeoNet/User Datagram Protocol/Internet Protocol"), in cellular 4G or 5G, or MQTT/TCP/IP (Message Queuing Telemetry Transport/Transmission Control Protocol/Internet Protocol), also in cellular.

The first terminal 110 may be a mobile terminal such as a mobile phone, for example of smartphone type, a digital tablet, or a personal computer.

The first terminal 110 is associated with the first vehicle 170. The first vehicle 170 is for example located at a traffic lane VC. The first vehicle 170 can for example circulate on the traffic lane VC.

The first terminal 110 can thus be positioned on the first vehicle 170, typically inside the first vehicle 170, or incorporated into the first vehicle 170, i.e. forming part of the onboard systems of the vehicle 170.

Each second terminal 130 can be a mobile terminal such as a mobile phone, for example of smartphone type, a digital tablet, or a personal computer.

Furthermore, each second terminal 130 is associated with an element 180 of a traffic lane, this element 180 being typically a mobile element such as a vehicle or a living being, or a fixed element, such as a road sign, a speed camera or a video camera.

Each traffic lane element 180 is for example located at a traffic lane VC, which may be different from the traffic lane VC of the first vehicle 170. When the element 180 is mobile, it circulates for example on the traffic lane VC or beside it (typically when the first mobile element is a living being). When the element 180 is fixed, it can be positioned at the traffic lane VC, typically beside or above it.

Each second terminal 130 can thus be positioned on a vehicle 180, typically inside the vehicle 180, or incorporated into the vehicle 180, i.e. forming part of the onboard systems of the vehicle 180.

Each vehicle 170, 180 can take the form of a motor vehicle such as a motor car, a delivery van, a truck, a coach bus or a two-wheeler, a bicycle, a train, a tram or else a boat or an airplane. Additionally, the traffic lanes VC mentioned in this document can be land, sea or air lanes. In addition, each vehicle 170, 180 can be an autonomous vehicle.

In addition, the first vehicle 170 can be any type of vehicle. Additionally, the first vehicle 170 can be an ordinary vehicle or a priority emergency services vehicle such as an ambulance, a firetruck or a police car.

The urgency management service server is a server linked to an urgency management service, this service typically offering users of this service the ability to indicate an urgency state of the vehicle.

The remote server 120 is a server able to store a plurality of elements of information described hereinafter, relating to the first vehicle 170 and each traffic lane element 180. The remote server 120 is thus able to use these elements of information in order to remotely manage the urgency state of a vehicle such as the first vehicle 170.

As shown in FIG. 2, the remote server 120 has the conventional architecture of a computer. The remote server 120 particularly includes a processor 200, a read-only memory 202 (of ROM type), a rewritable non-volatile memory 204 (of EEPROM or Flash NAND type), a rewritable volatile memory 206 (of RAM type), and a communication interface 208.

The read-only memory 202 of the remote server 120 constitutes a recording medium in accordance with an exemplary embodiment of the invention, readable by the processor 200 and wherein is recorded a computer program P1 in accordance with an exemplary embodiment of the invention. In a variant, the computer program P1 is stored in the rewritable non-volatile memory 204.

The computer program P1 may allow the remote server 120 to implement at least a part of the managing method in accordance with an exemplary embodiment of the invention.

This computer program P1 can thus define functional and software modules of the remote server 120, configured to implement the steps of a managing method in accordance with an exemplary embodiment of the invention, or at least a part of these steps. These functional modules are based on or control the hardware elements 200, 202, 204, 206 and 208 of the platform 110 previously mentioned. They may in particular here comprise the receiving module, the determining module and the sending module of the system 100.

The first terminal 110, each second terminal 130, and/or the urgency management service server can also have the conventional architecture of a computer, and can then each particularly include a processor, a read-only memory (of ROM type), a rewritable non-volatile memory (of EEPROM or Flash NAND type for example), a rewritable volatile memory (of RAM type), and a communication interface 208.

Each read-only memory may constitute a recording medium in accordance with an exemplary embodiment of the invention, readable by the associated processor and on which is recorded a computer program in accordance with an exemplary embodiment of the invention. As a variant, the computer program is stored in the associated rewritable non-volatile memory. The computer program can allow the implementation of at least a part of the managing method in accordance with an exemplary embodiment of the invention.

Each computer program can thus define functional and software modules configured to implement the steps of a managing method in accordance with an exemplary embodiment of the invention, or at least a part of these steps. These functional modules are based on or control the hardware elements mentioned previously and may in particular comprise the receiving module, the determining module and the sending module of the system 100.

Furthermore, each second terminal 130 may comprise an onboard camera, a speed camera, a microphone, a laser scanner and/or a GPS or Galileo guidance means.

In a variant each element 180 of a traffic lane may comprise an onboard camera, a speed camera, a microphone and/or a GPS or Galileo guidance means, to which the second terminal 130 has access.

FIG. 3 shows a method 300 for managing an urgency state of a first vehicle, according to an exemplary embodiment of the invention.

The method may be implemented by the managing system 100 described with reference to FIGS. 1 and 2. The first vehicle 170 in an urgency state is then the first vehicle 170 described with reference to FIG. 1.

In a step E310, a first indication SI of the urgency state of the first vehicle 170 is transmitted, for example to the remote server 120.

The urgency is typically a medical or life-threatening urgency, relating to one or more living beings such as human beings. The urgency thus for example relates to an injured person or a woman in labor.

The first vehicle 170 may transport one or more living beings in an urgency situation to a place where the urgency can be handled such as a medical facility, or direct itself to a place where one or more living beings are in an urgency situation, such as a place where an accident happened.

The first indication SI may comprise at least one identifying element of the first vehicle 170, and/or at least one characterizing element of the first vehicle 170.

The identifying element is typically the registration plate of the first vehicle 170 or the MSISDN (Mobile Station Integrated Services Digital Network) number of the first terminal 110 associated with the first vehicle 170. Furthermore, each characterizing element may indicate:
- the category to which the first vehicle 170 belongs, i.e. indicate whether the first vehicle 170 is a motor car, a truck, a coach bus, a two-wheeler, a bicycle, a train, a tram, a boat, an airplane etc.,
- a sub-category of the category to which the first vehicle 170 belongs. For example, this information may pertain to the type of vehicle, mark of the vehicle, model of the vehicle, color of the vehicle etc.,
- the communication abilities of the first vehicle 170,
- the degree of autonomy of the first vehicle 170.

Furthermore, the first indication SI may comprise an element of information relating to the type of urgency of the first vehicle 170. The type of urgency can for example be a road accident, a woman about to give birth, an unconscious person, a broken bone, a burn etc.

In addition, the first indication SI may comprise an element of information relating to the so-called confirmed departure point of the first vehicle 170, an element of information relating to the so-called confirmed arrival point of the first vehicle 170, and/or an element of information relating to one or more potential itineraries of the first vehicle 170.

The term "confirmed" is here used to denote a departure point, an arrival point or a known itinerary of the first vehicle 170. The term "potential" is used to denote a departure point, an arrival point or an unknown itinerary of the first vehicle 170 which is unknown or uncertain, but which can respectively be the departure point, the arrival point or the itinerary of the first vehicle 170. The first indication SI of the urgency state is typically sent by the first terminal 110 associated with the first vehicle 170, for example in the form of a message and via the telecommunications network 160.

When the first vehicle 170 is a priority emergency services vehicle, the sending of the indication by the first terminal 110 can be triggered by the actuation of an indicating device of the first vehicle 170, such as a siren or a flashing light.

In a variant or as a supplement, the sending of the first indication SI by the first terminal 110 may be triggered by a validation of a user at the first terminal 110. In a variant, the sending of the first indication SI can be triggered by a validation of a user at another terminal, the user being for example be a bystander outside the first vehicle 170, such as a member of the family of a pregnant woman wishing to indicate that the first vehicle 170 is departing from a confirmed departure point with this pregnant woman on board.

Each identifying or characterizing element of the first indication SI can have been previously indicated, for example during the registration of the user with the urgency management service, or indicated by the user just before the triggering of the sending, for example via a computer application or an Internet site.

Furthermore, each possible element of information relating to the type of urgency, the confirmed departure point, the confirmed arrival point, and/or the potential itinerary or itineraries of the first vehicle 170 may be indicated by the user just before the triggering of the sending, or obtained from a GPS or Galileo guidance means. To help the user to state the element of information relating to the type of urgency, a list comprising pre-filled elements of information can be presented to the user.

The first indication SI of the urgency state can also take the form of a phone call to a dedicated service, to allow the first indication SI in most cases, even by a bystander outside the first vehicle 170, by means of another terminal.

The first indication SI is typically received by the remote server 120 (step F310).

In a step F320, the remote server 120 may determine the level of urgency NU of the first vehicle 170, as a function of the element of information relating to the type of urgency. The determination of the level of urgency NU makes it possible to determine the level of priority of the first vehicle 170 for the journey that must be taken in an urgency state.

The level of urgency typically increases as a function of the severity of the urgency and the number of living beings concerned.

The remote server 120 can optionally send a message to the first terminal 170 to request more information about the type of urgency and in order to better determine the level of urgency.

In a variant, when the indication SI is received by the server of the urgency management service, this server then determines the level of urgency of the first vehicle 170 as a function of the element of information relating to the type of urgency.

The server of the urgency management service then sends a second indication SI to the remote server 120, comprising the level of urgency.

The second indication may also comprise the element of information relating to the confirmed arrival point. Thus, for example, when the urgency management service is a fire service triggering an intervention, the location of the intervention can be obtained on the basis of the element of information relating to the confirmed arrival point.

In another variant, the first terminal 110 determines the level of urgency of the first vehicle 170 as a function of the element of information relating to the type of urgency, and can then send the level of urgency to the remote server 120 in the indication message of step E310.

In a step F330, a list of potential itineraries LIP comprising at least one potential itinerary of the first vehicle 170 is determined, typically by the remote server 120.

When the first indication SI received in step F310 comprises the element of information relating to the potential itinerary or itineraries of the first vehicle 170, each potential itinerary indicated by this element of information is added to the list of potential itineraries LIP.

When the first indication SI received in step F310 comprises the element of information relating to the confirmed departure point of the first vehicle 170 and the element of information relating to the confirmed arrival point of the first vehicle 170, the remote server 120 determines one or more potential itineraries as a function of these elements of information relating to the confirmed departure points and arrival points. For example, a single optimum itinerary can be determined.

Each itinerary is typically determined on the basis of various navigation and mapping software programs.

When the first indication SI received in step F310 does not comprise any element of information relating to the confirmed departure point of the first vehicle 170, one or more potential departure points of the first vehicle 170 may then be determined by the remote server 120.

Similarly, when the indication received in step F310 does not comprise any element of information relating to the confirmed arrival point of the first vehicle 170, one or more potential arrival points of the first vehicle 170 may then be determined by the remote server 120.

One or more potential itineraries may be determined by the remote server 120 on the basis of each pair of a potential departure point and a potential arrival point, of each pair of a confirmed departure point and a potential arrival point, and/or of each pair of a potential departure point and a confirmed arrival point.

The step F330 may comprise a substep of determining a departure area of the first vehicle 170.

For example, when the first indication SI of the urgency state takes the form of a message, the terminal that sends the message can be located on the basis of this sending in order to determine the departure area. In addition, when the indication of the urgency state takes the form of a phone call, the phone call can be located in order to determine the departure area.

This sub-step of determining a departure area is followed by a sub-step of determining one or more potential departure points in the departure area, then a sub-step of determining, for each determined potential departure point, one or more potential itineraries on the basis of said potential departure point.

When the first indication SI comprises the element of information relating to a confirmed departure point and the element of information relating to the type of urgency, the step F330 may comprise a sub-step of determining one or more potential arrival points as a function of the element of information relating to the confirmed departure point and the element of information relating to the confirmed departure point and the element of information relating to the type of urgency of the first vehicle 170.

The remote server 120 can then determine one or more potential arrival points corresponding to the nearest emergence response sites to the confirmed departure point.

Specifically, in certain urgency situations such as a departure to a maternity ward, the user of the first terminal 110 may be incapable of indicating the coordinates of the maternity ward. In addition, after a road accident, the user of the first terminal 110 may not know the location of the nearest hospital.

The step F330 then next comprises, for each determined potential arrival point, a determination of one or more potential itineraries on the basis of the confirmed departure point and of said determined potential arrival point.

For each potential itinerary of the list of potential itineraries LIP, a potential journey time DTP associated with said potential itinerary can be determined by the remote server 120, in a step F335.

In order to correct each journey time, the remote server 120 can apply a correction ratio computed as a function of an element of real-time traffic information, and where applicable an element of information relating to a level of vehicles able to take into account an instruction as sent in step F392.

Furthermore, the corrective rate can be computed as a function of the level of urgency determined in the step F320. Specifically, the higher the level of urgency, the higher the speed of travel of the first vehicle 170 can be (this speed gain may however be not very significant when traffic is flowing smoothly.)

Next, the remote server 120 can determine a most likely arrival point as a function of each potential journey time and/or an item of information relating to the ability to manage the urgency at the arrival point of each potential itinerary.

The information relating to the ability to manage the urgency at the arrival point can for example announce the presence of the doctor that can treat the type of urgency and/or the saturation at the location where the urgency associated with the arrival point is responded to.

The remote server 120 can then send, to the first terminal 110, the potential itinerary associated with the most probable arrival point (also known as the optimal itinerary). The first vehicle 170 can then follow this optimal itinerary, by adapting its driving to the level of urgency determined in step F320.

As a variant, the terminal 110 can implement the step F330 and where applicable the step F335, then send to the remote server 120 the list of potential itineraries LIP and where applicable the potential journey time DTP associated with each potential itinerary of the list of potential itineraries LIP.

Each potential itinerary can be divided into several itinerary portions, each itinerary portion being associated with a journey period, such as to obtain, for the end of each portion, a potential time of passage of the first vehicle 170.

In a so-called preliminary step G340, one or more second terminals 130 associated with traffic lane elements 180 can send one or more identifying elements EI and/or one or more characterizing elements ECA relating to the associated element 180, typically to the remote server 120 via the telecommunications network 160.

Each identifying element EI sent by a traffic lane element is typically the MSISDN of the second terminal 130 associated with the element 180 of a traffic lane. In a variant, the identifying element EI can be the plate number of the traffic lane element.

Furthermore, each characterizing element ECA of a traffic lane element 180 can indicate:
 the category to which the traffic lane element 180 belongs, i.e. to state whether the element 180 is fixed or mobile, or more precisely if the element 180 is a motor vehicle, a truck, a coach bus, two-wheeler, a bicycle, a train, a tram, a boat, an airplane, a human being, an animal, a road sign, a speed camera, a surveillance camera etc., a sub-category of the general category to which the traffic lane element 180 belongs. For example, if the element 180 is a vehicle, this information can pertain to the type of vehicle, the mark of the vehicle, the model of the vehicle, the color of the vehicle etc.

a feature of the traffic lane element 180. For example, if the element 180 is a vehicle, this can be the weight of the vehicle, the maximum speed of the vehicle if the vehicle is a priority emergency services vehicle, etc.

an ability of analysis of the traffic lane element 180, the degree of autonomy of the traffic lane element 180.

The category and subcategory can be sent in message of CAM (Cooperative Awareness Message), defined in the ETSI EN 302 637-2 standard, or another type of message.

The degree of autonomy here denotes the ability of the element 180 to follow and/or respond to an instruction such as an instruction sent in the step F392 described hereinafter. For example, an entirely autonomous vehicle can automatically act on the instruction and thus perform the associated maneuver, a vehicle possessing assisted driving may require an acknowledgement from the driver, and a vehicle not possessing assisted driving does not respond to the instructions.

Each identifying EI or characterizing ECA element of a traffic lane element 180 is typically sent by the second terminal 130 associated with the element 180 during the registration of the second terminal 130 associated with the element 180 to the urgency management service or during the registration of the traffic lane element 180.

In a variant, each identifying EI or characterizing ECA element can be sent by the second terminal 130 associated with the element 180 during an outfitting of the second terminal 130 associated with the traffic lane element 180, or at the start of a journey.

The second terminal 130 associated with the traffic lane element 180 can then keep all or part of its data, and send it to the remove server 120 after being authenticated to the remote server 120, which makes it possible to preserve the anonymity of the data when the method is not implemented. In a variant, in order to avoid an excessively high data transfer volume, the second terminal 130 associated with the traffic lane element 180 can send a link to a storage space of another remote server, typically after authenticating the second terminal 130 to the remote server 120 and where applicable to the other remote server.

Of course, the sending of one or more identifying EI or characterizing ECA elements can be repeated one or more times in order to update this element or elements in the remote server 120.

Specifically, certain characterizing elements such as the weight of the traffic lane element may vary over time. For example, the weight of a truck varies according to the loading of this truck. The triggering of the sending and therefore the updating is manual or automatic by means of a sensor.

The remote server 120 receives one or more identifying EI or characterizing ECA elements in a step F340, then records them in order to store it, typically securely, where applicable after certifying them.

Furthermore, each second terminal 130 associated with a traffic lane element 180 can send, for example periodically, one or more contextual elements ECO, typically to the remote server 120 via the telecommunications network 160 (step G345).

Each contextual element ECO sent can be:

a geolocation position of the traffic lane element 180, a provisional itinerary of the traffic lane element 180, the speed of the traffic lane element 180, an item of information related to the traffic in the environs of the geolocation position of the traffic lane element 180 etc.

The contextual element or elements ECO may be sent in a CAM (Cooperative Awareness Message), defined in the ETSI EN 302 637-2 standard, or another type of message.

The remote server 120 receives the contextual element or elements ECO in a step F345, then records it in order to store it, typically securely, where applicable after certifying them.

In a step F350, for each itinerary of the potential list of itineraries LIP, one or more elements able to confirm that the first vehicle 170 is following the potential itinerary are determined by the remote server 120, from among the traffic lane elements 180 that have sent an identifying or characterizing element in step G340. Such elements able to detect the first vehicle 170 and thus to confirm that the first vehicle 170 is following the potential itinerary will hereinafter be referred to as detecting elements ED.

More precisely, one or more detecting elements ED may be searched for at one or more itinerary portions of each potential itinerary, typically the itinerary portions able to be followed by the first vehicle 170 during a predetermined time period comprising one or more successive journey periods. Each of these detecting elements ED is then able to confirm that the first vehicle 170 is following the associated itinerary portion.

The predetermined time period is typically determined as a function of contextual elements such as traffic on each potential itinerary, the speed of the first vehicle 170, etc. It can moreover be determined on the basis of histories by lane portion. This time period is typically of a few minutes, in particular when the traffic lane element 180 is circulating in town during a traffic peak, due to the frequency random incidents that may occur. The time period may however be longer when the traffic lane element 180 is circulating in an environment involving a greater regularity of speed and trajectory, such as a freeway on which the traffic is low.

The time period is typically less than five minutes, for reliability reasons.

A detecting element ED associated with an itinerary portion is typically determined as a function of one or more contextual elements, sent in the step G345.

More precisely, when the provisional itinerary of a traffic lane element 180 is received by the remote server 120, the remote server 120 determines, on the basis of this provisional itinerary, if this traffic lane element 180 is able to be situated at an itinerary portion of the potential itinerary (i.e. on or very near) for example on a traffic lane crossing the itinerary portion) during the journey period associated with this itinerary portion. If this is the case, the remote server 120 determines that this traffic lane element 180 is a detecting element ED, adds the detecting element ED to a list of detecting elements ED associated with this itinerary portion, for example by adding to this list the identifying element of the detecting element ED.

When the geolocation position of the traffic lane element 180 is received by the remote server 120 but not the provisional itinerary of the traffic lane element 180, the remote server 120 may compute one or more provisional trajectories during the predetermined time period on the basis of the geolocation position. Furthermore, the speed and direction of travel may be determined by the remoter server 120.

The remote server 120 then determines, on the basis of the provisional trajectory or trajectories, and where applicable on the basis of the speed and direction of travel, whether or not this traffic lane element is able to be located at an itinerary portion of the potential itinerary (i.e. on or in immediate proximity) during the journey period associated with this itinerary portion. If this is the case, the remote server 120 determines that this traffic lane element 180 is a detecting element ED, and adds the detecting element ED to a list of detecting elements ED associated with this itinerary portion, for example by adding to this list the identifying element of the detecting element ED.

When a detecting element ED is determined by the remote server 120 for an itinerary portion associated with a given itinerary, the detecting element ED can be added to a list of detecting elements associated with said itinerary portion and with the associated journey period.

Each list of detecting elements ED may comprise one or more detecting elements ED identical to those of another list of detecting elements ED (in particular when these detecting elements ED are following the same trajectory as the first vehicle 170 in the same direction of circulation), but can also comprise one or more different detecting elements ED.

For example, it is considered that the first vehicle 170 departs from a point A at a time TO, toward an arrival point PT and that, in the first minutes of its journey, it is able to take a first potential itinerary or a second potential itinerary. The remote server 120 then determines that during a first journey period of a few minutes, the first vehicle 170 should circulate on a first itinerary portion of the first potential itinerary or on a second itinerary portion of the second potential itinerary.

The remote server 120 then determines which traffic lane elements 180 are able to be located on the first itinerary portion or the second itinerary portion, during the first journey period, these traffic lane elements then becoming detecting elements ED.

The remote server 120 can similarly determine the detecting elements ED for the following itinerary portions of the two potential itineraries.

In a step F360, the remote server 120 sends an alert message MA to at least one of the detecting elements ED determined in the step F350, for example each detecting element ED determined in the step F350. Each alert message MA sent to a detecting element ED is typically received, in a step G360, by the second terminal 130 associated with said detecting element ED.

An alert message sent to a given detecting element ED typically indicates that the first vehicle 170 is in an urgency state, and moreover further indicates that the first vehicle 170 is able to follow a portion of lane on which the detecting element ED is able to be located during the associated journey period.

Also, the alert message may comprise the identifying element of the first vehicle 170, one or more characterizing elements of the first vehicle 170, the element of information relating to the type of urgency, an element of information relating to the level of urgency of the first vehicle 170, the element of information about one or more potential or confirmed departure points, an element of information about the itinerary portion in question, an element of information about the associated journey period in question etc.

The alert message can further comprise an instruction to act as sent in the step F392 described below.

The step F360 can be repeated one or more times.

In a step G370, at least one detecting element ED detects the first vehicle 170. The detecting element ED then sends (step G375) a location message ML of the first vehicle 170, typically to the remote server 120, which receives it in a step F375.

The steps G370 and G375 are typically implemented by the second terminal 130 associated with the detecting element ED.

The location message ML typically comprises an element of information about the location of the first vehicle 170, and where applicable one or more identifying EI, characterizing ECA and/or contextual ECO elements of the first vehicle 170.

More precisely, during the detecting step G370, the geolocation position and where applicable an identifying element of the first vehicle 170 (typically registration plate number) may be obtained.

In addition, at least one characterizing element (typically the category, and a sub-category) and/or contextual element of the first vehicle 170 may be obtained during the detecting step G370.

For example, the second terminal 130 associated with the detecting element ED analyzes one or more images obtained by an onboard camera of the second terminal 130 in order to detect and identify the first vehicle 170, or analyzes an electromagnetic signal sent by means of the speed camera from the second terminal 130 or the detecting element ED, reflected by the first vehicle 170, then received by the speed camera.

The second terminal 130 then compares the data obtained to the identifying and/or characterizing element to determine the presence of the first vehicle 170.

In a variant or in a supplement, the second terminal 130 associated with the detecting element ED detects the implementation, by an executing element, of at least one maneuver instruction as sent in the step F392 described hereinafter, and deduces therefrom a probability of presence of the first vehicle 170.

The detection can be facilitated by alert signals emitted by the first vehicle 170 and detected by the detecting element ED. The alert signals are for example emitted by a siren, a flashing light or lights (headlamp flashing, hazard lights illuminated). The second terminal 130, having detected these distress signals and having been informed that it is able to detect the first vehicle 170 owing to the alert message received in step G360, it can deduce a probability of presence of the first vehicle 170.

The second terminal 130 can also determine the trajectory and speed of the first vehicle 170 during the detecting step G370.

The second terminal 130, having detected the first vehicle 170, can moreover implement an action according to an instruction as sent in the step F392 described hereinafter.

The step G370 is typically repeated, by the same detecting element ED or a different detecting element ED. The step G370 is thus typically implemented periodically.

In a variant, the step G370 is not implemented since the first vehicle 170 itself sends the location message ML to the step G375, typically periodically. The location message ML typically comprises the element of location information and where applicable an element of information relating to the itinerary followed by the first vehicle 170. This variant is typically implemented solely when the first vehicle 170 is a priority emergency services vehicle, in order to avoid certain abuses (for example when a user of a vehicle wishes to simplify his journey while the vehicle is not in an urgency state).

After receiving the location message ML (step F375), the remote server 120 can then confirm a potential itinerary of the first vehicle 170 as a function of the element of location information, the potential itinerary then becoming a confirmed itinerary IT (step F380).

More precisely, the remote server 120 validates one of the potential itineraries of the list of potential itineraries LIP determined in the step F330.

Furthermore, the remote server 120 can delete the other potential itinerary or itineraries from the list of potential itineraries LIP, such as to no longer send any alert message MA for these potential itineraries.

In a step F390, one or more elements able to perform an action with the purpose of letting the first vehicle 170 pass are determined, each element being subsequently called the executing element EE. More precisely, each executing element EE is searched for among the detecting elements ED of the list or lists of detecting elements ED associated with the portions of the confirmed itinerary.

Each executing element EE is determined as a function of one or more contextual elements of said executing element EE, such as its geolocation position, its provisional itinerary, its speed, the traffic in the environs of its geolocation position, its provisional trajectory etc., and as a function of the itinerary portions of the confirmed itinerary.

This determination can typically be carried out according to the steps E420 and E442 of the French patent application FR 3 076 046.

Thus, when it is determined as a function of the contextual elements that a detecting element ED of the list or lists of detecting elements ED associated with the itinerary portions of the confirmed itinerary is able to follow one of the itinerary portions of the confirmed itinerary upstream of the first vehicle 170 during the associated journey period, or to be situated upstream near this portion (for example at an intersection), said detecting element ED is then determined as being an executing element EE.

The step F390 is typically implemented by the remote server 120 and/or the first terminal 110.

In a step F392 the remote server 120 or the first terminal 110 sends an instruction message MI to each executing element EE determined in step F390. In a variant, the instruction message or messages MI are made available to the associated executing elements EE (collection server) by the remote server 120.

Each instruction message MI sent to an executing element EE is typically received by the second terminal 130 associated with said executing element EE (step G392).

Each instruction message MI confirms that the first vehicle 170 is following the confirmed itinerary. Furthermore, each instruction message MI may comprise one or more elements from among: the identifying element of the first vehicle 170, one or more characterizing and/or contextual elements of the first vehicle 170, the element of information relating to the type of urgency, the element of information relating to the level of priority of the first vehicle 170, an element of information about the itinerary portion on or near which the executing element EE may be located at the same time as the first vehicle 170, an element of information about the associated journey period etc.

Furthermore, each instruction message MI may comprise an instruction to let the first vehicle 170 pass. The instruction to let it pass may comprise a sub-instruction of an action to be performed in order to let it pass, associated with the executing element EE which receives the instruction message MI, the action making it possible to not disrupt the progress of the first vehicle 170, or at least to limit as much as possible any disruption to this progress.

The action to be performed is determined by the remote server 120 and/or by the first terminal 110.

On the basis of the contextual elements of the executing element EE and of the first vehicle 170, it is first determined whether, during the journey period associated with the itinerary portion on or near which the executing element EE may be located at the same time as the first vehicle 170, the executing element EE is able to circulate on the same traffic lane or on a different traffic lane. If the executing element EE is able to circulate on the same traffic lane, it can be determined whether or not the executing element EE is able to circulate:

on the same traffic lane as the first vehicle 170 or on another traffic lane, in the same direction of traffic flow as the first vehicle 170 or in the opposite direction, in front of the first vehicle 170 or behind the first vehicle 170, and/or at a lower speed than the first mobile element 170, or at a higher speed.

If the executing element EE is able to circulate on a different traffic lane, it can be determined whether or not the executing element EE is arriving at an intersection between its traffic lane and the traffic lane of the first mobile element 170.

Characterizing elements relating to the executing element EE and/or the first vehicle 170 may furthermore be considered, such as the category or the sub-category. In addition, the level of urgency determined in step F320 may be considered.

The elements of information gathered, hereinafter called the context of the maneuver, then make it possible to determine one or more actions corresponding to the maneuver to be made. This determination is typically performed in accordance with the step E430 described in the French patent FR 3 076 046 (the context of the maneuver corresponding to the concept of an event in this application).

A correspondence table can thus be consulted, the correspondence table typically comprising several maneuver frameworks, each maneuver framework being associated with one or more actions that can be performed, predetermined such as to let the first vehicle pass 170.

Each action can be a modification of a driving parameter, such as a change of trajectory or a speed modification (acceleration, slowdown, stop).

For example, a given executing element EE can pull over in order to let the first vehicle 170 pass, or accelerate all the way to a further lane portion allowing it to let the first vehicle 170 pass, or else to yield priority to the first vehicle 170 at a roundabout or a red light. In another example where the executing element EE is able to circulate on the same sub-lane as the first vehicle 170 and in front of the first vehicle 170, the action of the executing element EE can be to modify its trajectory in order to typically move away toward the right (in countries where the vehicles drive on the right). In another example where the executing element EE is able to circulate on another sub-lane to the first vehicle 170, in front of and in the opposite direction to the first vehicle 170, the action of the executing element EE can be to modify its trajectory in order to typically move away toward the left (in countries where the vehicles drive on the right).

Furthermore, when the element of information relating to the level of urgency indicates that the urgency is low, the action can be one of the abovementioned actions (pull over in order to let the first vehicle 170 pass, accelerate to a further lane portion allowing it to let the first vehicle 170 pass, yield priority to the first vehicle 170), while when the element of information relating to the level of urgency indicates that the urgency is severe (for example life-threatening), the action can be to block the traffic at an intersection, in order to let the first vehicle 170 pass more quickly.

Each action may be associated with a start time of the performance of the action and/or a provisional duration of the action. Specifically, this action must not be done either too early, since that would disrupt the traffic for no reason, or too late, since that would impede the progress of the first vehicle 170.

The start time of the performance of the action and/or the provisional duration are obtained as a function of contextual elements of the detecting element ED and/or of the first vehicle 170. The speed, trajectory and direction of travel can for example be considered. The level of urgency determined in step F320 can also be considered, such that the higher the level of urgency, the earlier the starting time.

The starting time of the performance of the action is typically in the form of a GMT clock time, or in the form of a remaining time period. The starting time of the performance of the action is thus not necessarily immediate.

The degree of autonomy can thus also be taken into account during the determination of each instruction.

In a step G394, at least one executing element EE having received an instruction message implements the instruction of this instruction message, at the indicated departure time.

The steps F390, F392 and where applicable the step G394 can be repeated, typically when a new itinerary is confirmed in step F380 after a new detection of the first vehicle 170 by a detecting element ED (step G370), until the first vehicle 170 arrives at the confirmed arrival point.

The remote server 120 can send a message, via the telecommunications network 160, instead of the urgency response corresponding to the confirmed arrival point in the step F320 and in the step E340, typically to alert the personnel of the time remaining before the arrival of the first vehicle 170.

A history of urgency state indications of the first vehicle 170 can be archived by the remote server 120, associated with the identifying element of the first vehicle 170, the arrival point, and/or an indication about the fact that the first vehicle has reached the confirmed arrival point. It is thus possible to determine any abuse.

The steps F310, F320, F330, F335, F340, F345, F350, F360, F375, F380, F390, F392 are typically implemented by the remote server 120. In a variant, one or more of these steps can be implemented by a second terminal 130 associated with a traffic lane element 180 and/or the first terminal 110 associated with the first vehicle 170.

The invention claimed is:

1. A method for managing an urgency state of a first vehicle, implemented by a managing system, wherein the method comprises:
    receiving a first indication of the urgency state of the first vehicle;
    sending an alert message to at least one detecting element, located at a traffic lane, said at least one detecting element being determined as a function of at least one potential itinerary of the first vehicle, the alert message comprising an identifying element of the first vehicle allowing the detection of the first vehicle by the detecting element;
    receiving a message of location of the first vehicle coming from said at least one first detecting element; and
    confirming said at least one potential itinerary as a confirmed itinerary, as a function of the location message received.

2. The method as claimed in claim 1, wherein the first indication includes an element of information relating to the confirmed arrival point of the first vehicle, said at least one potential itinerary of the first vehicle being determined as a function of said confirmed arrival point.

3. The method as claimed in claim 1, further comprising sending of an instruction message to at least one so-called executing element, said at least one executing element being determined as a function of said confirmed itinerary.

4. The method as claimed in claim 3, wherein the first indication comprises an element of information relating to the type of urgency of the first vehicle,
    the method further comprising determining the level of urgency as a function of said element of information relating to the type of urgency,
    the alert message comprising an element of information relating to the level of urgency of the first vehicle, and/or
    the instruction message comprising the element of information relating to the level of urgency of the first vehicle.

5. The method as claimed in claim 1, wherein determining at least one potential itinerary comprises:
    determining a departure area of the first vehicle,
    determining at least one potential departure point in the departure area,
    for each potential departure point, determining at least one potential itinerary, on the basis of said potential departure point.

6. The method as claimed in claim 4, wherein the first indication comprises an element of information relating to a confirmed departure point, and the determining at least one potential itinerary comprises:
    determining at least one potential arrival point as a function of said element of information relating to the confirmed departure point and of the element of information relating to the type of urgency of the first vehicle,
    for each potential arrival point, determining at least one potential itinerary, on the basis of the confirmed departure point and of said potential arrival point.

7. The method as claimed in claim 6, further comprising:
    determining a potential journey time associated with said at least one potential itinerary,
    determining a most likely arrival point as a function of each potential journey time and/or of an item of information relating to the ability to manage the urgency at the arrival point of said at least one potential itinerary,
    transmitting to the first vehicle at least one potential itinerary associated with a most probable arrival point.

8. The method as claimed in claim 1, wherein said at least one detecting element is determined as a function of at least one contextual element relating to said at least one detecting element, from among the following list of contextual elements:
    a geolocation position,
    a provisional itinerary,
    a speed,
    an item of information related to the traffic in the environs of the geolocation position of the detecting element,
    said detecting element being able to be situated on at least one itinerary portion of said at least one potential itinerary, said at least one itinerary portion being able to be followed by the first vehicle during a predetermined time period, said at least one detecting element being added to a list of detecting elements associated with said at least one itinerary portion of said at least one potential itinerary, said predetermined time period being less than five minutes.

9. The method as claimed in claim 1, further comprising:
detecting an implementation of at least one maneuver instruction of the instruction message by said at least one executing element,
deducing a probability of presence of the first vehicle as a function of the detection of the implementation of said at least one maneuver instruction of the instruction message,
sending a second location message of the first vehicle.

10. The method as claimed in claim 8, wherein said at least one executing element is determined from among said at least one detecting element of said at least one list of detecting elements.

11. A device for managing an urgency state of a first vehicle, comprising:
a processor; and
a non-transitory computer-readable medium comprising instructions stored thereon which when executed by the processor configure the device to:
receive a first indication of the urgency state of the first vehicle;
send an alert message to at least one detecting element, situated at a traffic lane, said at least one detecting element being determined as a function of said at least one potential itinerary of the first vehicle, the alert message comprising an identifying element of the first vehicle allowing the detection of the first vehicle by the detecting element;
receive a message of location of the first vehicle coming from said at least one first detecting element; and
confirm said at least one potential itinerary as a confirmed itinerary, as a function of the location message received.

12. A non-transitory recording medium readable by a computer on which is recorded a computer program comprising instructions for executing a method for managing an urgency state of a first vehicle, implemented by a managing system, when the instructions are executed by a processor of the managing system, the method for managing comprises:
receiving a first indication of the urgency state of the first vehicle;
sending an alert message to at least one detecting element, located at a traffic lane, said at least one detecting element being determined as a function of at least one potential itinerary of the first vehicle, the alert message comprising an identifying element of the first vehicle allowing the detection of the first vehicle by the detecting element;
receiving a message of location of the first vehicle coming from said at least one first detecting element; and
confirming said at least one potential itinerary as a confirmed itinerary, as a function of the location message received.

* * * * *